US011724849B2

(12) United States Patent
Hoon

(10) Patent No.: US 11,724,849 B2
(45) Date of Patent: Aug. 15, 2023

(54) PACKAGING AND METHOD FOR SINGLE SERVE BEVERAGE PRODUCT

(71) Applicant: Cometeer, Inc., Bedford, MA (US)

(72) Inventor: Douglas Martin Hoon, Guilford, CT (US)

(73) Assignee: COMETEER, INC., Gloucester, MA (US)

(*) Notice: Subject to any disclaimer, the term of this patent is extended or adjusted under 35 U.S.C. 154(b) by 246 days.

(21) Appl. No.: 16/892,906

(22) Filed: Jun. 4, 2020

(65) Prior Publication Data
US 2020/0385160 A1 Dec. 10, 2020

Related U.S. Application Data

(60) Provisional application No. 62/858,922, filed on Jun. 7, 2019.

(51) Int. Cl.
*B65D 1/30* (2006.01)
*B65D 65/10* (2006.01)
(Continued)

(52) U.S. Cl.
CPC ............. *B65D 1/30* (2013.01); *A23G 9/083* (2013.01); *B65B 7/164* (2013.01); *B65D 65/10* (2013.01);
(Continued)

(58) Field of Classification Search
CPC ............ B65D 1/00–30; B65D 65/10; B65D 77/2024; B65D 85/78; B65D 75/327;
(Continued)

(56) References Cited

U.S. PATENT DOCUMENTS 1,478,908 A 12/1923 Oldham
1,505,592 A 8/1924 Epperson
(Continued)

FOREIGN PATENT DOCUMENTS

CA 1157310 A 11/1983
CA 2087242 A1 7/1993
(Continued)

OTHER PUBLICATIONS

"Clever Cocktail Presentation Trick: How to Make an Ice Wedge Glass (for Free!)", https://www.manmadediy.com/diy-whiskey-wedge-glass, Aug. 27, 2018 (13 pages).
(Continued)

*Primary Examiner* — Kareen K Thomas
(74) *Attorney, Agent, or Firm* — Wilmer Cutler Pickering Hale and Dorr LLP

(57) ABSTRACT

A packaging method and packaging material are disclosed. In accordance with one aspect, a method for forming, filling, sealing and flash freezing a liquid extract or concentrate in a continuous ribbon format is described. The packaging material uses a continuous ribbon of a cold-formed foil base with multiple pockets arrayed in a pattern and a heat-sealed foil cover. Following sealing, the continuously formed strip of product is passed through a freezing medium, optionally perforated alongside the pockets to facilitate separation of individual pockets from a sheet, and then cut to size for convenient and space efficient final packaging, storage and transportation.

15 Claims, 7 Drawing Sheets

(51) Int. Cl.
*A23G 9/08* (2006.01)
*B65D 77/20* (2006.01)
*B65B 7/16* (2006.01)
*B65D 85/78* (2006.01)

(52) U.S. Cl.
CPC ......... *B65D 77/2024* (2013.01); *B65D 85/78* (2013.01)

(58) Field of Classification Search
CPC .... B65D 2575/3245; B65D 2575/3281; A23G 9/083; B65B 7/164; B65B 2220/24; B65B 9/042; B65B 31/028; B65B 61/007; B65B 61/184
See application file for complete search history.

(56) References Cited

U.S. PATENT DOCUMENTS

| | | |
|---|---|---|
| 2,155,971 A | 4/1939 | Houseman |
| 2,282,138 A | 5/1942 | Kellogg |
| 2,312,046 A | 2/1943 | Warren |
| 2,324,526 A | 7/1943 | Morgenthaler |
| 2,332,553 A | 10/1943 | Benedict |
| 2,432,759 A | 12/1947 | Heyman |
| 2,515,794 A | 7/1950 | Palmer |
| 2,559,032 A | 7/1951 | Tacchella |
| 2,620,276 A | 12/1952 | Heyman |
| 2,629,663 A | 2/1953 | Gogler et al. |
| 2,863,776 A | 12/1958 | Lisher |
| 2,887,038 A | 5/1959 | Axel |
| 2,955,044 A * | 10/1960 | Tupper .................. A23G 9/221 206/820 |
| 3,153,377 A | 10/1964 | Bosak |
| 3,228,876 A | 1/1966 | Mahon |
| 3,235,390 A | 2/1966 | Vischer |
| 3,246,786 A | 4/1966 | Holley |
| 3,261,507 A | 7/1966 | Cornelius |
| 3,296,822 A | 1/1967 | Gram |
| 3,349,691 A | 10/1967 | Austin et al. |
| 3,385,201 A | 5/1968 | Martin |
| 3,412,572 A | 11/1968 | Kesling |
| 3,432,027 A | 3/1969 | Mueller |
| 3,450,070 A | 6/1969 | Kaufman |
| 3,458,320 A | 7/1969 | Niven |
| 3,484,245 A | 12/1969 | Goto |
| 3,582,351 A | 6/1971 | Austin et al. |
| 3,589,272 A | 6/1971 | Bouladon et al. |
| 3,607,280 A | 9/1971 | Durchholz |
| 3,620,034 A | 11/1971 | Ganiaris |
| 3,655,398 A | 4/1972 | Pitchon et al. |
| 3,682,649 A | 8/1972 | Orozovich |
| 3,700,466 A | 10/1972 | Bergeron et al. |
| 3,762,177 A | 10/1973 | Ganiaris |
| 3,762,930 A | 10/1973 | Mahlmann |
| 3,769,033 A | 10/1973 | Panzer et al. |
| 3,788,860 A | 1/1974 | Mahlmann |
| 3,790,689 A | 2/1974 | Pitchon et al. |
| 3,799,049 A | 3/1974 | Smith, Jr. |
| 3,800,055 A | 3/1974 | Gallagher |
| 3,830,940 A | 8/1974 | Sivetz |
| 3,843,824 A | 10/1974 | Roselius et al. |
| 3,908,033 A | 9/1975 | Ganiaris |
| 3,914,956 A | 10/1975 | Knight, Jr. |
| 3,920,226 A | 11/1975 | Walt |
| 3,922,361 A | 11/1975 | Vann |
| 3,995,067 A | 11/1976 | Marsh et al. |
| 4,039,693 A | 8/1977 | Adams et al. |
| 4,105,802 A | 8/1978 | Cho et al. |
| 4,110,476 A | 8/1978 | Rhodes |
| 4,136,202 A | 1/1979 | Favre |
| 4,156,031 A | 5/1979 | Hamell et al. |
| 4,158,329 A | 6/1979 | McKnight |
| 4,189,991 A | 2/1980 | Haddad |
| 4,226,891 A | 10/1980 | Lewis |
| 4,276,315 A | 6/1981 | Katz et al. |
| 4,277,509 A | 7/1981 | Wouda |
| 4,285,490 A | 8/1981 | Hanley |
| 4,310,468 A | 1/1982 | Reiners |
| 4,352,829 A | 10/1982 | Noyes et al. |
| 4,377,970 A | 3/1983 | Kenkel |
| 4,414,113 A | 11/1983 | LaTerra |
| 4,426,573 A | 1/1984 | Fudickar et al. |
| 4,427,701 A | 1/1984 | Morley |
| 4,505,191 A | 3/1985 | Longo |
| 4,534,985 A | 8/1985 | Gasau |
| 4,579,048 A | 4/1986 | Stover |
| 4,633,771 A | 1/1987 | Anderl |
| 4,641,572 A | 2/1987 | Varga |
| 4,681,030 A | 7/1987 | Herbert |
| 4,721,035 A | 1/1988 | Chang-Diaz |
| 4,737,374 A | 4/1988 | Huber et al. |
| 4,750,645 A | 6/1988 | Wilson et al. |
| 4,784,678 A | 11/1988 | Rudick et al. |
| 4,794,008 A | 12/1988 | Schmidt et al. |
| 4,811,872 A | 3/1989 | Boyd |
| 4,813,646 A * | 3/1989 | Fujio ....................... A23G 9/503 426/414 |
| 4,842,884 A | 6/1989 | Bookwalter et al. |
| 4,844,918 A | 7/1989 | Hoashi |
| 4,853,234 A | 8/1989 | Bentley et al. |
| 4,882,982 A | 11/1989 | Muttoni |
| 4,899,976 A * | 2/1990 | Cederroth ............... F25C 1/243 206/532 |
| 4,907,725 A | 3/1990 | Durham |
| 4,929,462 A | 5/1990 | Moorman et al. |
| 4,998,462 A | 3/1991 | Sekiguchi |
| 5,041,245 A | 8/1991 | Benado |
| 5,043,178 A | 8/1991 | Gottesman et al. |
| 5,080,008 A | 1/1992 | Helbling |
| 5,094,153 A | 3/1992 | Helbling |
| 5,114,047 A | 5/1992 | Baron et al. |
| 5,114,728 A | 5/1992 | Ben-Nasr et al. |
| 5,114,731 A | 5/1992 | Belville et al. |
| 5,115,730 A | 5/1992 | Gockelmann |
| 5,127,318 A | 7/1992 | Selby, III |
| 5,151,287 A | 9/1992 | Schlecht et al. |
| 5,168,794 A | 12/1992 | Glucksman |
| 5,185,505 A | 2/1993 | Grzywana |
| 5,204,136 A | 4/1993 | Hellemons |
| 5,216,327 A | 6/1993 | Myers et al. |
| 5,230,278 A | 7/1993 | Bunn et al. |
| 5,242,700 A | 9/1993 | Schlecht |
| 5,255,593 A | 10/1993 | Bunn et al. |
| 5,267,506 A | 12/1993 | Cai |
| 5,284,028 A | 2/1994 | Stuhmer |
| 5,297,472 A | 3/1994 | Suzuki et al. |
| 5,301,694 A | 4/1994 | Raymond et al. |
| 5,303,639 A | 4/1994 | Bunn et al. |
| 5,323,691 A | 6/1994 | Reese et al. |
| 5,325,765 A | 7/1994 | Sylvan et al. |
| 5,335,589 A | 8/1994 | Yerves, Jr. et al. |
| 5,337,652 A | 8/1994 | Fischer et al. |
| 5,343,799 A | 9/1994 | Fond |
| 5,347,916 A | 9/1994 | Fond et al. |
| 5,353,692 A | 10/1994 | Reese et al. |
| 5,363,745 A | 11/1994 | Lin |
| 5,372,832 A | 12/1994 | Bunn et al. |
| 5,392,694 A | 2/1995 | Muller et al. |
| 5,393,032 A * | 2/1995 | Cederroth .......... B65D 77/2052 206/532 |
| 5,393,540 A | 2/1995 | Bunn et al. |
| 5,398,596 A | 3/1995 | Fond |
| 5,427,806 A | 6/1995 | Ekanayake et al. |
| 5,473,973 A | 12/1995 | Cortese |
| 5,480,189 A | 1/1996 | Davies et al. |
| 5,497,792 A | 3/1996 | Prasad et al. |
| 5,507,415 A | 4/1996 | Sizemore |
| 5,525,746 A | 6/1996 | Franke |
| 5,637,343 A | 6/1997 | Ryan, Jr. |
| 5,638,740 A | 6/1997 | Cai |
| 5,651,482 A | 7/1997 | Sizemore |
| 5,656,316 A | 8/1997 | Fond et al. |
| 5,669,208 A | 9/1997 | Tabaroni et al. |
| 5,699,719 A | 12/1997 | Lucas et al. |

(56) References Cited

U.S. PATENT DOCUMENTS

| | | |
|---|---|---|
| 5,704,950 A | 1/1998 | Putatunda |
| 5,707,673 A | 1/1998 | Prevost et al. |
| 5,724,883 A | 3/1998 | Usherovich |
| 5,739,364 A | 4/1998 | Franke |
| 5,770,003 A | 6/1998 | Tabaroni et al. |
| D395,821 S | 7/1998 | Tabaroni et al. |
| 5,778,765 A | 7/1998 | Klawuhn et al. |
| D397,292 S | 8/1998 | Tabaroni et al. |
| 5,789,005 A | 8/1998 | Tabaroni et al. |
| 5,799,501 A | 9/1998 | Leonard et al. |
| 5,847,127 A | 12/1998 | D'Alessio et al. |
| 5,853,785 A | 12/1998 | Nayyar et al. |
| 5,868,062 A | 2/1999 | Enomoto |
| 5,897,899 A | 4/1999 | Fond |
| 5,901,636 A | 5/1999 | Witziers et al. |
| 5,927,085 A | 7/1999 | Waldman |
| 5,958,481 A | 9/1999 | Hodges |
| 5,976,588 A * | 11/1999 | Vincent ............... B65D 75/327 249/176 |
| 5,997,936 A | 12/1999 | Jimenez-Laguna |
| 6,026,732 A | 2/2000 | Kollep et al. |
| 6,041,697 A | 3/2000 | Maoz |
| 6,079,315 A | 6/2000 | Beaulieu et al. |
| 6,082,247 A | 7/2000 | Beaulieu |
| 6,102,213 A | 8/2000 | Gurol |
| 6,112,537 A | 9/2000 | Broadbent |
| 6,142,063 A | 11/2000 | Beaulieu et al. |
| 6,180,149 B1 | 1/2001 | Gramm |
| 6,182,554 B1 | 2/2001 | Beaulieu et al. |
| 6,203,837 B1 | 3/2001 | Kalenian |
| 6,224,683 B1 | 5/2001 | Tanikawa et al. |
| 6,277,426 B1 | 8/2001 | Reust |
| 6,286,415 B1 | 9/2001 | Leung |
| 6,311,500 B1 * | 11/2001 | Fraenkel ............... F25C 1/243 62/66 |
| 6,339,985 B1 | 1/2002 | Whitney |
| 6,407,224 B1 | 6/2002 | Mironov et al. |
| 6,440,256 B1 | 8/2002 | Gordon et al. |
| 6,444,160 B1 | 9/2002 | Bartoli |
| 6,511,963 B1 | 1/2003 | Maccecchini |
| 6,513,578 B2 | 2/2003 | Frank |
| 6,514,552 B1 | 2/2003 | Sivetz |
| 6,534,108 B2 | 3/2003 | Jimenez-Laguna et al. |
| 6,548,094 B2 | 4/2003 | Kalenian |
| 6,551,646 B1 | 4/2003 | Baker |
| 6,589,577 B2 | 7/2003 | Lazaris et al. |
| 6,602,538 B1 | 8/2003 | Watkins, Jr. et al. |
| 6,602,879 B2 | 8/2003 | Murthy et al. |
| 6,606,938 B2 | 8/2003 | Taylor |
| 6,607,762 B2 | 8/2003 | Lazaris et al. |
| 6,609,821 B2 | 8/2003 | Wulf et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| 6,727,484 B2 | 4/2004 | Policappelli |
| 6,740,345 B2 | 5/2004 | Cai |
| 6,887,506 B2 | 5/2005 | Kalenian |
| 6,948,420 B2 | 9/2005 | Kirschner et al. |
| 7,004,322 B1 | 2/2006 | Bartoli |
| 7,093,816 B2 * | 8/2006 | Lacan .................. F25C 1/243 426/106 |
| 7,165,488 B2 | 1/2007 | Bragg et al. |
| 7,168,560 B2 | 1/2007 | Finetti et al. |
| 7,192,629 B2 | 3/2007 | Lammertink et al. |
| 7,258,061 B2 | 8/2007 | Campbell et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| D574,182 S * | 8/2008 | Shannon ............... D7/357 |
| 7,419,692 B1 | 9/2008 | Kalenian |
| 7,464,636 B2 | 12/2008 | Mariller |
| 7,473,869 B2 | 1/2009 | Chun |
| 7,493,930 B2 | 2/2009 | Finetti et al. |
| 7,513,192 B2 | 4/2009 | Sullivan et al. |
| 7,523,695 B2 | 4/2009 | Streeter et al. |
| 7,591,217 B2 | 9/2009 | Kodden et al. |
| 7,640,845 B2 | 1/2010 | Woodnorth et al. |
| 7,726,233 B2 | 6/2010 | Kodden et al. |
| 7,820,948 B1 | 10/2010 | Renau |
| 7,875,304 B2 | 1/2011 | Kalenian |
| 7,959,851 B2 | 6/2011 | Finetti et al. |
| 7,959,967 B2 | 6/2011 | Pattenden |
| 8,087,347 B2 | 1/2012 | Halliday et al. |
| 8,151,694 B2 | 4/2012 | Jacobs et al. |
| 8,361,527 B2 | 1/2013 | Winkler et al. |
| 8,402,781 B2 | 3/2013 | Cocchi et al. |
| 8,475,153 B2 | 7/2013 | Finetti et al. |
| 8,495,949 B2 | 7/2013 | Tinkler et al. |
| 8,516,948 B2 | 8/2013 | Zimmerman et al. |
| 8,524,306 B2 | 9/2013 | Robinson et al. |
| 8,534,501 B2 | 9/2013 | Nevarez et al. |
| 8,535,748 B2 | 9/2013 | Robinson et al. |
| 8,541,042 B2 | 9/2013 | Robinson et al. |
| 8,563,058 B2 | 10/2013 | Roulin et al. |
| 8,573,114 B2 | 11/2013 | Huang et al. |
| 8,609,170 B2 | 12/2013 | Tinkler et al. |
| 8,628,811 B2 | 1/2014 | Panyam et al. |
| 8,663,080 B2 | 3/2014 | Bartoli et al. |
| 8,667,892 B2 | 3/2014 | Cominelli et al. |
| 8,685,479 B2 | 4/2014 | Dogan et al. |
| 8,709,519 B1 | 4/2014 | dePoo |
| 8,722,124 B2 | 5/2014 | Ozanne |
| 8,752,478 B2 | 6/2014 | Nocera |
| 8,758,844 B2 | 6/2014 | Nocera |
| 8,800,431 B2 | 8/2014 | Sullivan et al. |
| 8,808,775 B2 | 8/2014 | Novak et al. |
| 8,826,811 B2 | 9/2014 | Kim |
| 8,834,948 B2 | 9/2014 | Estabrook et al. |
| 8,863,987 B2 | 10/2014 | Jacobs et al. |
| 8,877,276 B2 | 11/2014 | Cominelli et al. |
| 8,889,203 B2 | 11/2014 | York |
| 8,916,215 B2 | 12/2014 | Yoakim et al. |
| 8,920,858 B2 | 12/2014 | Yauk et al. |
| 8,956,672 B2 | 2/2015 | Yoakim et al. |
| 8,960,078 B2 | 2/2015 | Hristov et al. |
| 8,962,048 B2 | 2/2015 | Gerbaulet et al. |
| 8,973,341 B2 | 3/2015 | Bartoli et al. |
| 9,016,196 B2 | 4/2015 | Hensel |
| 9,023,412 B2 | 5/2015 | Doleac et al. |
| 9,079,705 B2 | 7/2015 | Digiuni |
| 9,085,410 B2 | 7/2015 | Beer |
| 9,107,444 B2 | 8/2015 | Lynn et al. |
| 9,113,744 B2 | 8/2015 | Digiuni |
| 9,120,617 B2 | 9/2015 | Beer |
| 9,161,652 B2 | 10/2015 | Kamerbeek et al. |
| D742,679 S | 11/2015 | Bartoli et al. |
| 9,192,189 B1 | 11/2015 | McDermott et al. |
| 9,205,975 B2 | 12/2015 | Giovanni |
| 9,232,871 B2 | 1/2016 | Rivera |
| 9,247,430 B2 | 1/2016 | Kountouris et al. |
| 9,259,114 B2 | 2/2016 | Nevarez et al. |
| 9,277,758 B2 | 3/2016 | Zeller et al. |
| 9,346,611 B1 | 5/2016 | Roberts et al. |
| 9,408,492 B1 | 8/2016 | Roberts et al. |
| 9,408,493 B1 | 8/2016 | Roberts et al. |
| 9,468,230 B2 | 10/2016 | Roberts et al. |
| 9,516,970 B2 | 12/2016 | Roberts et al. |
| 9,538,877 B2 | 1/2017 | Roberts et al. |
| 9,615,597 B2 | 4/2017 | Roberts et al. |
| 9,630,770 B2 | 4/2017 | Roberts et al. |
| 9,675,203 B2 | 6/2017 | Roberts et al. |
| 10,111,554 B2 | 10/2018 | Roberts et al. |
| 10,264,912 B2 | 4/2019 | Roberts et al. |
| 10,501,248 B2 * | 12/2019 | Ghiam .................. A61J 1/035 |
| 11,096,518 B2 | 8/2021 | Roberts et al. |
| 11,484,041 B2 | 11/2022 | Hoon et al. |
| 2001/0002269 A1 | 5/2001 | Zhao |
| 2001/0006695 A1 | 7/2001 | Jimenez-Laguna et al. |
| 2001/0043954 A1 | 11/2001 | Sweet |
| 2001/0052294 A1 | 12/2001 | Schmed |

(56) References Cited

U.S. PATENT DOCUMENTS

| | | |
|---|---|---|
| 2002/0048621 A1 | 4/2002 | Boyd et al. |
| 2002/0148356 A1 | 10/2002 | Lazaris et al. |
| 2003/0006185 A1 | 1/2003 | Hepler |
| 2003/0118707 A1 | 6/2003 | Kalenian |
| 2003/0172813 A1 | 9/2003 | Schifferle |
| 2003/0222089 A1 | 12/2003 | Hale |
| 2004/0045265 A1 | 3/2004 | Bartoli et al. |
| 2004/0075069 A1 | 4/2004 | Bartoli et al. |
| 2004/0077475 A1 | 4/2004 | Bartoli |
| 2004/0118290 A1 | 6/2004 | Cai |
| 2004/0144800 A1 | 7/2004 | Danby et al. |
| 2004/0232595 A1 | 11/2004 | Bartoli |
| 2004/0247721 A1 | 12/2004 | Finetti et al. |
| 2004/0250686 A1 | 12/2004 | Hale |
| 2004/0256766 A1 | 12/2004 | Finetti et al. |
| 2005/0008754 A1 | 1/2005 | Sweeney et al. |
| 2005/0017118 A1 | 1/2005 | Finetti et al. |
| 2005/0034580 A1 | 2/2005 | Finetti et al. |
| 2005/0034817 A1 | 2/2005 | Finetti et al. |
| 2005/0039849 A1 | 2/2005 | Finetti et al. |
| 2005/0051033 A1 | 3/2005 | Lassota |
| 2005/0112253 A1 | 5/2005 | Kalenian |
| 2005/0130820 A1 | 6/2005 | Finetti et al. |
| 2005/0138902 A1 | 6/2005 | Bartoli et al. |
| 2005/0160918 A1 | 7/2005 | Winstanley et al. |
| 2005/0160919 A1 | 7/2005 | Balkau |
| 2005/0163892 A1 | 7/2005 | Breslow et al. |
| 2005/0247205 A1 | 11/2005 | Chen et al. |
| 2005/0266122 A1 | 12/2005 | Franceschi et al. |
| 2006/0000363 A1 | 1/2006 | Streeter et al. |
| 2006/0019000 A1 | 1/2006 | Zanetti |
| 2006/0083835 A1 | 4/2006 | Raghavan et al. |
| 2006/0107841 A1 | 5/2006 | Schifferle |
| 2006/0115573 A1 | 6/2006 | Singer et al. |
| 2006/0121173 A1* | 6/2006 | Black .................. C12G 3/06 426/592 |
| 2006/0127555 A1 | 6/2006 | Breslow et al. |
| 2006/0174769 A1 | 8/2006 | Favre et al. |
| 2006/0185372 A1 | 8/2006 | Conde Hinojosa |
| 2006/0196363 A1 | 9/2006 | Rahn |
| 2006/0219098 A1 | 10/2006 | Mandralis et al. |
| 2006/0243838 A1 | 11/2006 | Nakato |
| 2006/0255066 A1 | 11/2006 | Kannar et al. |
| 2006/0273013 A1 | 12/2006 | Chin et al. |
| 2007/0077343 A1 | 4/2007 | Ma et al. |
| 2007/0175334 A1 | 8/2007 | Halliday et al. |
| 2007/0202237 A1 | 8/2007 | Yoakim et al. |
| 2007/0210105 A1 | 9/2007 | Malachowsky et al. |
| 2007/0251260 A1 | 11/2007 | Baxter et al. |
| 2007/0251397 A1 | 11/2007 | Dorsten et al. |
| 2008/0038441 A1 | 2/2008 | Kirschner |
| 2008/0041236 A1 | 2/2008 | Raouf et al. |
| 2008/0089983 A1 | 4/2008 | Coste |
| 2008/0233264 A1 | 9/2008 | Doglioni Majer et al. |
| 2009/0061219 A1 | 3/2009 | Spynda et al. |
| 2009/0092724 A1 | 4/2009 | Mattie |
| 2009/0109793 A1 | 4/2009 | Xue |
| 2009/0126577 A1 | 5/2009 | Ternite |
| 2009/0127297 A1 | 5/2009 | Zirps |
| 2009/0214713 A1 | 8/2009 | Banim et al. |
| 2009/0223375 A1 | 9/2009 | Verbeek |
| 2009/0235827 A1 | 9/2009 | Bongers et al. |
| 2009/0235828 A1 | 9/2009 | Kerstens |
| 2009/0266239 A1 | 10/2009 | Noordhuis |
| 2010/0015313 A1 | 1/2010 | Harris |
| 2010/0018405 A1 | 1/2010 | Duvall |
| 2010/0034929 A1 | 2/2010 | Dogan et al. |
| 2010/0083843 A1 | 4/2010 | Denisart et al. |
| 2010/0098812 A1 | 4/2010 | Le et al. |
| 2010/0104695 A1 | 4/2010 | Faella et al. |
| 2010/0107889 A1 | 5/2010 | Denisart et al. |
| 2010/0143565 A1 | 6/2010 | McGill |
| 2010/0209563 A1 | 8/2010 | Mark |
| 2010/0215808 A1 | 8/2010 | Versini |
| 2010/0239734 A1 | 9/2010 | Yoakim et al. |
| 2010/0266740 A1 | 10/2010 | Van Den Aker et al. |
| 2010/0282088 A1 | 11/2010 | Deuber et al. |
| 2010/0287951 A1 | 11/2010 | Lynn et al. |
| 2010/0288131 A1 | 11/2010 | Kilber et al. |
| 2010/0303964 A1 | 12/2010 | Beaulieu et al. |
| 2011/0024409 A1 | 2/2011 | Shah et al. |
| 2011/0041701 A1 | 2/2011 | Chatterjee et al. |
| 2011/0045144 A1 | 2/2011 | Boussemart et al. |
| 2011/0070348 A1 | 3/2011 | Burton-Wilcock et al. |
| 2011/0071009 A1 | 3/2011 | Bartoli et al. |
| 2011/0076361 A1 | 3/2011 | Peterson et al. |
| 2011/0094195 A1 | 4/2011 | Bartoli et al. |
| 2011/0117259 A1 | 5/2011 | Storek et al. |
| 2011/0183043 A1 | 7/2011 | Reati |
| 2011/0200726 A1 | 8/2011 | Tinkler et al. |
| 2011/0203740 A1 | 8/2011 | Finetti et al. |
| 2011/0226343 A1 | 9/2011 | Novak et al. |
| 2011/0244099 A1 | 10/2011 | Perentes et al. |
| 2011/0274802 A1 | 11/2011 | Rivera |
| 2011/0293805 A1 | 12/2011 | Perentes et al. |
| 2011/0300276 A1 | 12/2011 | Ozanne |
| 2012/0030869 A1 | 2/2012 | Del Saz Salazar |
| 2012/0063753 A1 | 3/2012 | Cochran et al. |
| 2012/0070542 A1 | 3/2012 | Camera et al. |
| 2012/0100275 A1 | 4/2012 | Bishop et al. |
| 2012/0121779 A1 | 5/2012 | Lai et al. |
| 2012/0207895 A1 | 8/2012 | Rivera |
| 2012/0207896 A1 | 8/2012 | Rivera |
| 2012/0267036 A1 | 10/2012 | Bartoli et al. |
| 2012/0276264 A1 | 11/2012 | Rivera |
| 2012/0291634 A1 | 11/2012 | Startz |
| 2012/0308688 A1 | 12/2012 | Peterson et al. |
| 2012/0308691 A1 | 12/2012 | Alvarez et al. |
| 2013/0043151 A1 | 2/2013 | Bartoli et al. |
| 2013/0055902 A1 | 3/2013 | Berto et al. |
| 2013/0077148 A1 | 3/2013 | Ribi |
| 2013/0098249 A1 | 4/2013 | Fidler et al. |
| 2013/0101716 A1 | 4/2013 | Beaulieu et al. |
| 2013/0118360 A1 | 5/2013 | Dogan et al. |
| 2013/0139699 A1 | 6/2013 | Rivera |
| 2013/0156897 A1 | 6/2013 | Goldstein |
| 2013/0180406 A1 | 7/2013 | Hay et al. |
| 2013/0193616 A1 | 8/2013 | Bartoli et al. |
| 2013/0199378 A1 | 8/2013 | Yoakim et al. |
| 2013/0202748 A1 | 8/2013 | Fountain et al. |
| 2013/0202761 A1 | 8/2013 | McKee |
| 2013/0209627 A1 | 8/2013 | MacPherson |
| 2013/0232992 A1 | 9/2013 | Bisceglie |
| 2013/0239817 A1 | 9/2013 | Starr et al. |
| 2013/0243929 A1 | 9/2013 | Matsui |
| 2013/0327223 A1 | 12/2013 | Bartoli et al. |
| 2014/0007776 A1 | 1/2014 | Mori et al. |
| 2014/0026761 A1 | 1/2014 | Bartoli et al. |
| 2014/0057033 A1 | 2/2014 | Lai et al. |
| 2014/0076167 A1 | 3/2014 | Boggavarapu |
| 2014/0106033 A1 | 4/2014 | Roberts |
| 2014/0134299 A1 | 5/2014 | Guidorzi et al. |
| 2014/0137210 A1 | 5/2014 | Kountouris et al. |
| 2014/0154387 A1 | 6/2014 | Almblad et al. |
| 2014/0199442 A1 | 7/2014 | Orsi |
| 2014/0216276 A1 | 8/2014 | Soderman |
| 2014/0272077 A1 | 9/2014 | Robinson et al. |
| 2014/0287105 A1 | 9/2014 | Husband et al. |
| 2014/0295030 A1 | 10/2014 | Downes et al. |
| 2014/0331987 A1 | 11/2014 | Ford et al. |
| 2014/0342060 A1 | 11/2014 | Bartoli et al. |
| 2014/0352543 A1 | 12/2014 | Boni et al. |
| 2015/0001100 A1 | 1/2015 | Bartoli et al. |
| 2015/0024179 A1 | 1/2015 | Huang |
| 2015/0047509 A1 | 2/2015 | Trombetta et al. |
| 2015/0068405 A1 | 3/2015 | Bartoli et al. |
| 2015/0072052 A1 | 3/2015 | Bartoli et al. |
| 2015/0107275 A1 | 4/2015 | Papalia |
| 2015/0108011 A1 | 4/2015 | Bartoli et al. |
| 2015/0128525 A1 | 5/2015 | Bartoli et al. |
| 2015/0140251 A1 | 5/2015 | Bartoli et al. |
| 2015/0151903 A1 | 6/2015 | Bartoli et al. |
| 2015/0201790 A1 | 7/2015 | Smith et al. |
| 2015/0201796 A1 | 7/2015 | Kuempel et al. |

(56) References Cited

U.S. PATENT DOCUMENTS

| | | |
|---|---|---|
| 2015/0210030 A1 | 7/2015 | Bartoli et al. |
| 2015/0217880 A1 | 8/2015 | Bartoli et al. |
| 2015/0217881 A1 | 8/2015 | Bartoli et al. |
| 2015/0232279 A1 | 8/2015 | Bartoli et al. |
| 2015/0257588 A1 | 9/2015 | Stein et al. |
| 2015/0327717 A1 | 11/2015 | Burrows |
| 2015/0329282 A1 | 11/2015 | Bartoli et al. |
| 2015/0344219 A1 | 12/2015 | Bartoli et al. |
| 2015/0367269 A1 | 12/2015 | Bartoli et al. |
| 2016/0000135 A1 | 1/2016 | Evans et al. |
| 2016/0001903 A1 | 1/2016 | Bartoli et al. |
| 2016/0023226 A1 | 1/2016 | Wickert et al. |
| 2016/0051079 A1 | 2/2016 | Abegglen et al. |
| 2016/0183544 A1 | 6/2016 | Fitch et al. |
| 2017/0014836 A1 | 1/2017 | Fisher |
| 2017/0055557 A1 | 3/2017 | Roberts et al. |
| 2018/0319533 A1* | 11/2018 | Hogan ............... B65D 75/327 |
| 2020/0085231 A1 | 3/2020 | Roberts et al. |
| 2020/0146308 A1 | 5/2020 | Roberts et al. |
| 2020/0178553 A1 | 6/2020 | Roberts et al. |
| 2020/0216237 A1* | 7/2020 | Meager ............. B65D 51/1677 |
| 2021/0037847 A1 | 2/2021 | Hoon et al. |
| 2022/0218144 A1 | 7/2022 | Roberts et al. |

FOREIGN PATENT DOCUMENTS

| | | |
|---|---|---|
| CA | 2789993 A1 | 10/2004 |
| CA | 2902391 A1 | 9/2014 |
| CN | 1071810 A | 5/1993 |
| CN | 1615780 A | 5/2005 |
| CN | 101035719 A | 9/2007 |
| CN | 201005504 Y | 1/2008 |
| CN | 101322523 A | 12/2008 |
| CN | 101720842 A | 6/2010 |
| CN | 102144703 A | 8/2011 |
| CN | 201957705 U | 9/2011 |
| CN | 201987311 U | 9/2011 |
| CN | 102326810 A | 1/2012 |
| CN | 202197798 U | 4/2012 |
| CN | 102574638 A | 7/2012 |
| CN | 102816875 A | 12/2012 |
| CN | 103180225 A | 6/2013 |
| CN | 103380066 A | 10/2013 |
| CN | 103815788 A | 5/2014 |
| CN | 104968218 A | 10/2015 |
| DE | 3318317 A1 | 11/1984 |
| DE | 19706005 A1 | 8/1998 |
| EP | 0256567 A2 | 2/1988 |
| EP | 0412496 A2 | 2/1991 |
| EP | 0812558 A1 | 12/1997 |
| EP | 0893065 A2 | 1/1999 |
| EP | 0916266 A1 | 5/1999 |
| EP | 0941668 A1 | 9/1999 |
| EP | 1440910 A1 | 7/2004 |
| EP | 1488838 A1 | 12/2004 |
| EP | 1787523 A2 | 5/2007 |
| EP | 2468159 A1 | 6/2012 |
| EP | 2384133 B2 | 3/2013 |
| EP | 3629758 | 4/2020 |
| EP | 3503770 | 4/2021 |
| EP | 3868261 | 8/2021 |
| GB | 691845 A | 5/1953 |
| GB | 1169586 A | 11/1969 |
| GB | 2410998 A | 8/2005 |
| JP | H01194915 A | 8/1989 |
| JP | 02-031663 | 2/1990 |
| JP | 02138938 | 5/1990 |
| JP | H02119748 A | 5/1990 |
| JP | 4045747 B2 | 2/1992 |
| JP | H04088948 | 3/1992 |
| JP | H11-221061 A | 8/1999 |
| JP | 2008081208 A | 4/2008 |
| JP | 2008-521399 A | 6/2008 |
| JP | 2010220642 A | 10/2010 |
| JP | 2011-025951 A | 2/2011 |
| JP | 2012510267 A | 5/2012 |
| JP | 5101941 B2 | 12/2012 |
| JP | 2013-502925 A | 1/2013 |
| JP | 2013-537095 A | 9/2013 |
| JP | 2014-030768 A | 2/2014 |
| JP | 2014-505564 A | 3/2014 |
| JP | 2014520552 A | 8/2014 |
| JP | 6791941 B2 | 11/2020 |
| KR | 101075465 B1 | 10/2011 |
| NL | 6803767 A | 5/1968 |
| WO | WO-1993/09684 A1 | 5/1993 |
| WO | WO-199710720 A1 | 3/1997 |
| WO | WO-0019833 A2 | 4/2000 |
| WO | WO-0032058 A1 | 6/2000 |
| WO | WO-00/56163 A1 | 9/2000 |
| WO | WO-0130173 A2 | 5/2001 |
| WO | WO-2002059035 A2 | 8/2002 |
| WO | WO-2002/098759 | 12/2002 |
| WO | WO-2004067386 | 8/2004 |
| WO | WO-2004/091305 A1 | 10/2004 |
| WO | WO-2005/092160 A1 | 10/2005 |
| WO | WO-2006/017893 A1 | 2/2006 |
| WO | WO-2006/077259 A1 | 7/2006 |
| WO | WO-2006121353 A1 | 11/2006 |
| WO | WO-2008148604 | 12/2008 |
| WO | WO-2010014201 | 2/2010 |
| WO | WO-2010/066736 A1 | 6/2010 |
| WO | WO-2011084603 | 7/2011 |
| WO | WO-2011094677 | 8/2011 |
| WO | WO-2012/121779 A1 | 9/2012 |
| WO | WO-2012/174331 A1 | 12/2012 |
| WO | WO-2013039591 | 3/2013 |
| WO | WO-2013/124811 A1 | 8/2013 |
| WO | WO-2013121421 A1 | 8/2013 |
| WO | WO-2014/053614 A1 | 4/2014 |
| WO | WO-2014057094 | 4/2014 |
| WO | WO-2014060724 | 4/2014 |
| WO | WO-2014147256 | 9/2014 |
| WO | WO-2014206799 | 12/2014 |
| WO | WO-2015/001340 A1 | 1/2015 |
| WO | WO-2015/049049 A2 | 4/2015 |
| WO | WO-2015075535 A1 | 5/2015 |
| WO | WO-2015112192 A1 | 7/2015 |
| WO | WO-2016096611 | 6/2016 |
| WO | WO-2016/154037 A1 | 9/2016 |
| WO | WO-2018039675 | 3/2018 |
| WO | WO-2018200922 | 11/2018 |
| WO | WO-2018222677 | 12/2018 |

OTHER PUBLICATIONS

"How Come: Cold hard fact: Surface area matters", https://www.newsday.com/news/health/how-come-cold-hard-fact-surface-area-matters-1.1866438, updated Apr. 23, 2010, accessed Feb. 23, 2021 (3 pages).

40° Below Joe—Beaded Coffee, https://40belowjoe.com, accessed May 20, 2020 (7 pages).

Chemwiki, "Overview of Alcohol," http://chemwiki.ucdavis.edu/Organic_Chemistry/Alcohols/Properties_of_Alcohols/Overview_of_ Alcohol, 3 pages (2015).

Colonna and Smalls, "Catch Up", https://colonnaandsmalls.wordpress.com/2015/10/, Oct. 11, 2015 (5 pages).

Corrochano, et al., "A new methodology to estimate the steady-state permeability of roast and ground coffee in packed beds", Journal of Food Engineering, 150:106-116, 2015, available online Nov. 22, 2014 (11 pages).

European Extended Search Report issued in European Application No. EP21167377.7, dated Jul. 12, 2021 (8 pages).

Helmenstine, "What is the Freezing Point of Alcohol?—Freezing Temperature of Alcohol" http://chemistry.about.com/od/factsstructures/fl/What-is-the-Freezing-Point-of-Alcohol-Freezing-Temperature-of-Alcohol.htm, 4 pages (2015).

Helmenstine, "What is the Freezing Point of Water," http://chemistry.about.com/od/waterchemistry/f/freezing-point-of-water.htm, 3 pages (2015).

(56) References Cited

OTHER PUBLICATIONS

Helmenstine, "What is the Melting Point of Water?", http://chemistry.about.com/od/waterchemistry/f/What-Is-The-Melting-Point-Of-Water.htm, 3 pages (2015).
Hendon, et al., "The Grinder Paper: Explained", https://baristahustle.com/blogs/barista-hustle/the-grinder-paper-explained, Jan. 30, 2017 (9 pages).
International Search Report and Written Opinion as issued by the European Patent Office as International Searching Authority issued in International Application No. PCT/US18/29735, dated Sep. 17, 2018 (19 pages).
International Search Report and Written Opinion issued by the U.S. Patent and Trademark Office as International Searching Authority for International Application No. PCT/US16/40116 dated Oct. 4, 2016 (16 pages).
International Search Report and Written Opinion issued by the European Patent Office as International Searching Authority for International Application No. PCT/US2017/027149 dated Sep. 20, 2017 (29 pages).
International Search Report issued by the European Patent Office for International Application No. PCT/US99/23178 dated Oct. 24, 2000 (7 pages).
International Search Report and Written Opinion issued by European Patent Office as International Searching Authority in International Application No. PCT/US18/35073, dated Oct. 9, 2018 (18 pages).
International Search Report and Written Opinion issued by the European Patent Office as International Searching Authority for International Application No. PCT/US2016/023226 dated Jun. 27, 2016 (10 pages).
International Search Report and Written Opinion issued by the European Patent Office for International Application No. PCT/US2017/048932 dated Nov. 14, 2017 (13 pages).
International Search Report and Written Opinion issued by the Korean Intellectual Property Office for PCT/US13/64634, dated Mar. 21, 2014 (8 pages).
International Search Report issued by the European Patent Office for International Application No. PCT/US00/29651 dated Jun. 19, 2001 (6 pgs.).
Karpuschewski, B, et al., "Ice Blasting—An Innovative Concept for the Problem-Oriented Deburring of Workpieces", Burrs—Analysis, Control, and Removal, Springer-Verlag Berlin Heidelberg; pp. 197-201 (2010) (5 pages).
Perlmutter, B., "Solid-liquid filtration basics", Processing Magazine, http://www.processingmagazine.com/solid-liquid-filtration-basics/, Feb. 5, 2016 (13 pages).
Sahin, S., et al., "Chapter 1: Size, Shape, Volume, and Related Physical Attributes", in Physical Properties of Foods, Heldman Ed., Springer Science + Business Media, LLC, pp. 1-37, 2006 (50 pages).
Sheu, M.J. and Wiley, R.C., "Preconcentration of Apple Juice by Reverse Osmosis", Journal of Food Science, vol. 48, No. 2, pp. 422-429 (1983) (8 pages).

Spiro, M. and Selwood, R.M., "The Kinetics and Mechanism of Caffeine Infusion from Coffee: The Effect of Particle Size", J. Sci. Food Agric., 35:915-924, 1984 (10 pages).
Stewart, "Keep-Cool Cubes,"http://www.marthastewart.com/356419/flavored-ice-cube-ideas, 9 pages (Jul. 2012).
The Kitchn, "Why You Can Store Vodka But Not Beer in the Freezer," http://www.thekitchn.com/why-doesnt-alcohol-freeze-weve-got-chemistry-217962, 2 pages (Sep. 7, 2015).
Todd, "Iced Mocha with Coffee Cubes", URL: https://honestlyyum.com/4320/iced-mocha-with-coffee-cubes/, accessed Sep. 4, 2021, Honestly Yum, published Jun. 20, 2013 (16 pages).
Uman, et al., "The effect of bean origin and temperature on grinding roasted coffee", https://www.nature.com/articles/srep24483, Scientific Reports, 6, Article No. 24483, Apr. 18, 2016 (24 pages).
European Extended Search Report issued in European Application No. EP21200410.5, dated Jan. 27, 2022 (8 pages).
International Search Report and Written Opinion issued by U.S. Patent and Trademark Office as International Searching Authority in International Application No. PCT/US22/27855 dated Jul. 26, 2022 (13 pages).
"Loring ™ S15 Falcon™, Convection Drum Roaster with Paddle Stirring," Technical Data Sheet, Downloaded from https://loring.com/wp-content/uploads/2015/11/Loring-S15_EN_Tech-data_1002695_revB.pdf, accessed on Apr. 28, 2016 (2 pages).
"Loring™ S35 Kestrel™, Convection Drum Roaster with Paddle Stirring," Technical Data Sheet, Downloaded from https://loring.com/wp-content/uploads/2017/06/S35.pdf, accessed Apr. 28, 2016 (2 pgs.).
"Loring™ S70 Peregrine™, Convection Drum Roaster with Paddle Stirring," Technical Data Sheet, Downloaded from https://documents.pub/download/loring-s70-peregrine-2017-06-01-technical-data-sheet-depending-on-roaster-model, accessed on Apr. 28, 2016 (2 pages).
Basile, M. and Kikic, I., "A Lumped Specific Heat Capacity Approach for Predicting the Non-stationary Thermal Profile of Coffee During Roasting," Chem. Biochem. Eng. Q., 23(2):167-177, 2009 (11 pages).
Brown, N., "A Quantitative Description of the Sounds of Cracks During Roasting," Downloaded from http://dailycoffeenews.com/2014/05/26/a-quantitative-description-of-the-sounds-of-cracks-during-roasting/ May 26, 2014, accessed on Apr. 28, 2016 (3 pages).
Escudero, D. R., "Paper 11656: Bed height and material density effects on fluidized bed hydrodynamics," Thesis, Iowa State University, Ames, Iowa (2010) (117 pages).
Fabbri, A., et al., "Numerical model of heat and mass transfer during roasting coffee using 3D digitised geometry," 11th International Congress on Engineering and Food (ICEF11), Procedia Food Science, 1:742-746, 2011 (5 pages).
Schwartzberg, H., "Batch coffee roasting; roasting energy use; reducing that use," Advances in Food Process Engineering Research and Applications, Part II, Springer Science and Business Media, New York, pp. 173-195, Sep. 13, 2013 (15 pages).

\* cited by examiner

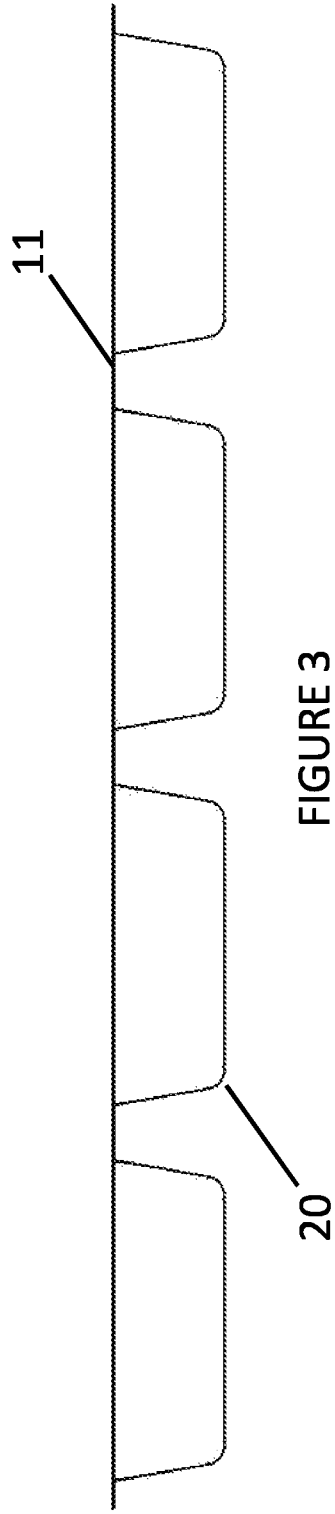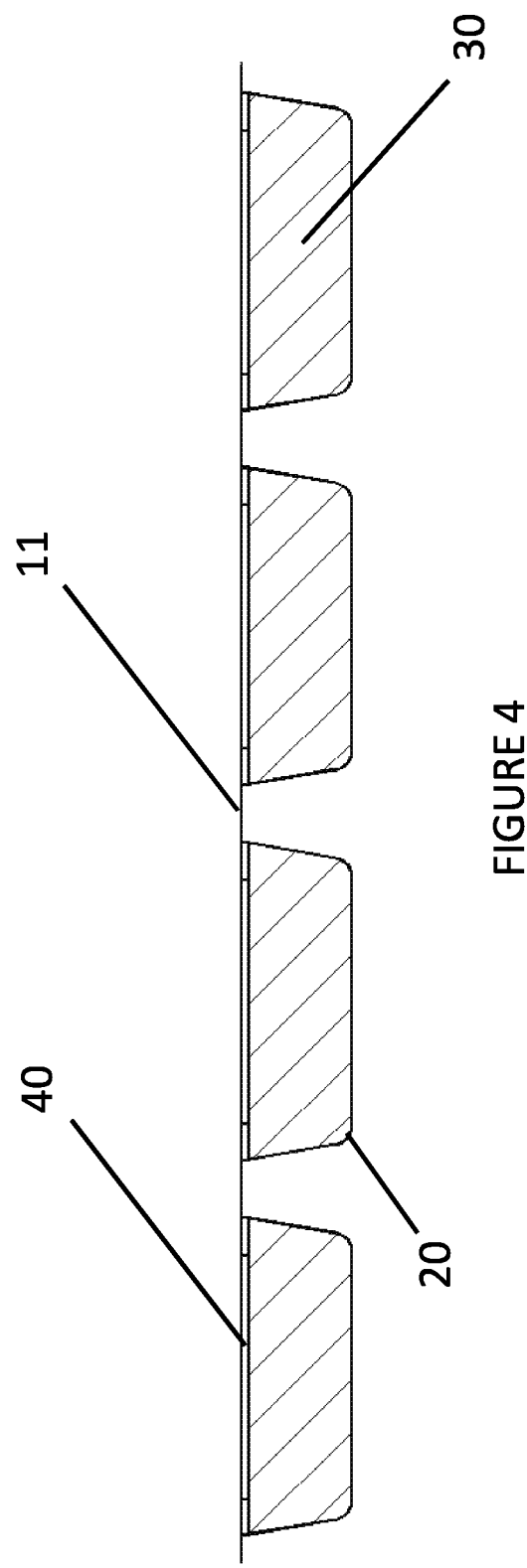

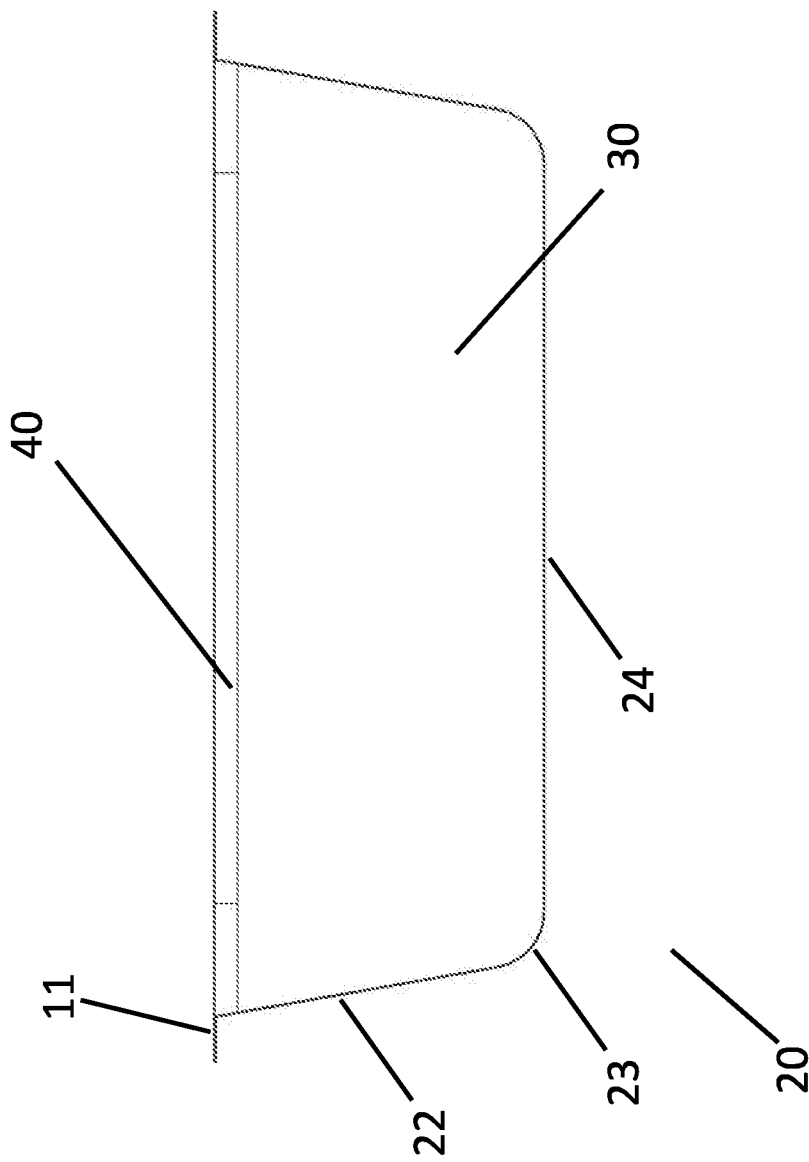

PACKAGING AND METHOD FOR SINGLE SERVE BEVERAGE PRODUCT

CROSS REFERENCE TO RELATED APPLICATION

This application claims the benefit of U.S. Provisional Patent Application No. 62/858,922, filed Jun. 7, 2019, the content of which is hereby incorporated by reference in its entirety.

TECHNICAL FIELD

The technical field relates generally to a method of and system for packaging and dispensing a premium single-serve beverage.

BACKGROUND

Premium beverage extracts and concentrates may be provided in individual capsules that are compatible with various dispensing machines that are capable of dispensing both hot and cold beverages. In some cases, an individually packaged capsule, e.g., something similar in shape to a K-cup, is filled, sealed, and flash frozen as an individual container. These capsules provide a convenient means for thawing the liquid frozen contents within, enable a very long shelf life if made from materials with good oxygen barrier properties (e.g., aluminum) and kept frozen, and can be easily recycled as they are washed clean during dispensing. The downside of this approach is that such individual packages are expensive to make and have a low packing density, which contributes to expensive storage and shipping in a frozen state.

SUMMARY

The techniques and methods described herein are for a less expensive and more easily stored and shipped packaging approach, one which is also convenient to use without the need for a machine, and is compatible with the same large range of products otherwise handled by the single serve capsules described above.

For purposes of definition, the formed foil base portion of the package is used to make "pockets" or "depressions", which can be filled with a liquid. This pocketed foil base is later sealed with a "cover." In some embodiments of this invention, the formed foil base is a sandwich material incorporating, for example, an aluminum foil to serve as a superb oxygen/gas barrier and layers of plastic film and adhesive to isolate the aluminum from contact with a food product, allow welding of foil and cover together, prevent oxidation of the aluminum, and provide a colorful surface for exterior graphics. In some embodiments of this invention, the plastic film is food safe and has low off-gassing and/or leaching properties, such as polypropylene or polyethylene. In accordance with certain embodiments, the foil base comprises an aluminum foil sandwiched between two thin plastic films, which may be the same on each side or different. In some embodiments, the foil base comprises an aluminum foil with a plastic film disposed on only one side of the aluminum foil.

Unlike individual pods, packaging using cold formed foil can be produced in continuous strips. In some embodiments of this invention, the width of the strip is two, three, four, or more "pockets" wide. In some embodiments of this invention, the continuous strip is formed, filled, frozen and separated into "sheets" in a series of connected steps comprising one long operation. For example, a smooth coil of material is unwound at one end of a machine, stamped to form the pockets, passed under a filling station wherein a liquid extract or concentrate is added to each pocket, passed through a modified atmosphere packaging (MAP) sealing station wherein a foil covering is sealed/welded to the surface, passed through a flash freezing station (e.g., liquid nitrogen bath or cryogenic freezer tunnel), passed through a perforation station wherein the webs between individual pockets are perforated for easier tearing by consumers, and then trimmed to the desired "sheet" of pockets at the other end of the machine for final packaging and cold storage. It will be understood by one knowledgeable in the art that while continuous strip processing is generally advantageous from an efficiency and cost perspective over singular sheet processing or even singular cavity processing, either of the latter can also be used to create the packaged products envisioned by this invention.

In some embodiments of this invention, the cold formed foil sheet/coil comprises an aluminum foil coated with a thin layer of polypropylene on the product/welding surface and, optionally, a second plastic, such as nylon or vinyl on the outer face.

In some embodiments of this invention, the foil covering also includes a polypropylene-faced or polyethylene-face aluminum such that the foil and the formed sheet/coil can be easily heat sealed/welded together or ultrasonically welded together.

In some embodiments of this invention, each "pocket" formed in the coil is sized to contain enough extract to deliver a single serving of the packaged beverage to the consumer.

In some embodiments of this invention, the coil is perforated between pockets such that the consumer can easily separate one serving at a time away from the full sheet.

In some embodiments of this invention, the welding head preferentially leaves small areas of the surface between the pocketed sheet and the foil covering unwelded, so it is easier for the consumer to peel the foil covering from the pocket. In some embodiments of this invention, the unwelded area occur in the corners of the sheet defined by transverse and longitudinal perforation lines.

In accordance with one embodiment, a method for forming a package for delivering frozen liquid content is disclosed. The method includes providing a coil of foil base material comprising one or more pockets within a planar surface, introducing a liquid extract or concentrate to each of said one or more pockets, attaching a foil cover to the planar surface of the foil base material, and flash freezing the liquid extract or concentrate in each of said one or more pockets.

In some aspects, the method further includes forming perforations between adjacent pockets to facilitate separation of the pockets.

In some aspects, the flash freezing comprises passing the liquid extract or concentrate through a liquid nitrogen bath or cryogenic freezer tunnel.

BRIEF DESCRIPTION OF THE DRAWINGS

Various objects, features, and advantages of the disclosed techniques can be more fully appreciated with reference to the following detailed description of the disclosed subject matter when considered in connection with the following drawings, in which like reference numerals identify like elements.

FIG. 3 is a side view of a packaged product in accordance with one embodiment.

FIG. 4 is a side cross-section view of a packaged product in accordance with one embodiment.

FIG. 5 is an enlarged cross-section view of a single pocket of a packaged product in accordance with one embodiment.

DETAILED DESCRIPTION

Figure 1:
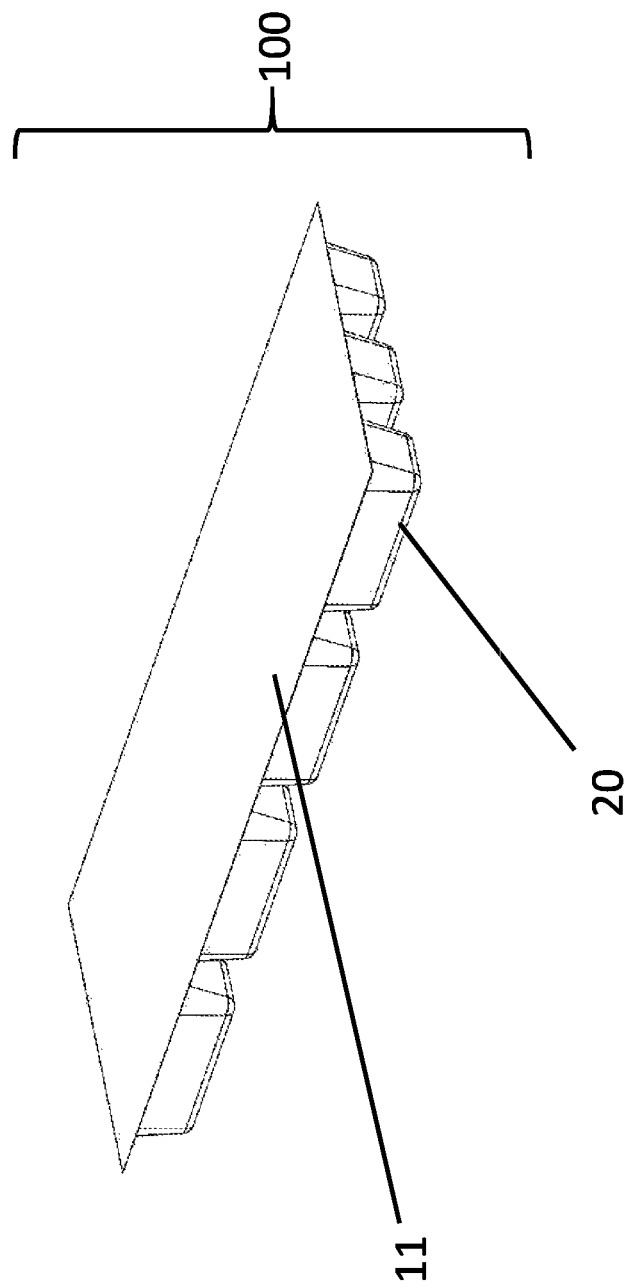
FIG. 1 is an isometric view of a 3×4 section of packaged product in accordance with one embodiment.

In the following description, numerous specific details are set forth regarding the systems and methods of the disclosed subject matter and the environment in which such systems and methods may operate to provide a thorough understanding of the disclosed subject matter. It will be apparent to one skilled in the art, however, that the disclosed subject matter may be practiced without such specific details, and that certain features, which are well known in the art, are not described in detail to avoid complication of the disclosed subject matter. In addition, it will be understood that the embodiments described below are exemplary, and that it is contemplated that there are other systems and methods that are within the scope of the disclosed subject matter.

According to an embodiment, a liquid food or beverage product may be dispensed into a pocket formed in a cold-formed foil base, covered and sealed using a layer of foil, and flash frozen to create a frozen liquid contents to preserve its taste and aroma. This format, using a cold-formed foil base, which in some embodiments is formed, filled, sealed and frozen in a continuous strip, reduces the cost of working with individual containers or capsules (e.g., a K-cup compatible container) and packages the product more densely with clear cost advantages for frozen storage and transportation. In some embodiments of this invention, the liquid food or beverage product may be a frozen coffee extract, a frozen tea extract, a frozen lemonade concentrate, a frozen vegetable concentrate, a frozen broth, a frozen liquid dairy product, a frozen alcohol product; a frozen concentrated soup, a frozen syrup, and a frozen fruit concentrate, or any combination thereof.

In some embodiments of this invention, the user separates one pocket from the remainder and removes or punctures the lid and thereafter transfers the contents (frozen or thawed) into a cup of hot water, cold/iced water, milk, etc. to enjoy the benefits of the premium taste and aroma that can be captured by flash freezing the product immediately after brewing or concentration. In some embodiments of this invention, the surfaces of the formed foil base and cover are perforated after forming/filling to simplify the separation process. In some embodiments of this invention, the surfaces between formed foil base and cover in a small area around the edge or corner of an individual pocket are not welded/heat sealed together to make it easier to grasp the cover and peel it away from the formed foil base.

In some embodiments of this invention, a special dispensing machine is adapted to take either continuous coils of formed-foil packets or sheets, for example a 3×4 pocket sheet, of material and automatically add water for melting and diluting the liquid frozen contents. Such machines could function similarly to machines for individual pod products, optimized for melting and diluting rather than brewing as described in commonly assigned U.S. Pat. Nos. 9,516,970 and 10,264,912 (the contents of which are hereby incorporated by reference), but have the additional feature of a user being able to load multiple (potentially hundreds) of servings at one time and thereafter have the machine automatically advance to the next available pocket.

To better explain some of these features, refer to the figures noted below.

FIG. 1 illustrates one embodiment of this invention wherein a 3×4 packet sheet 100 of product, consists of a series of formed foil pockets 20 and a sealed cover 11. In some embodiments of this invention, the pockets are created at regular intervals, both transversely and longitudinally, while leaving a planar space 21 between pocket edges to which a foil cover 11 can be heat sealed, glued or otherwise joined to the formed foil base.

Figure 2:
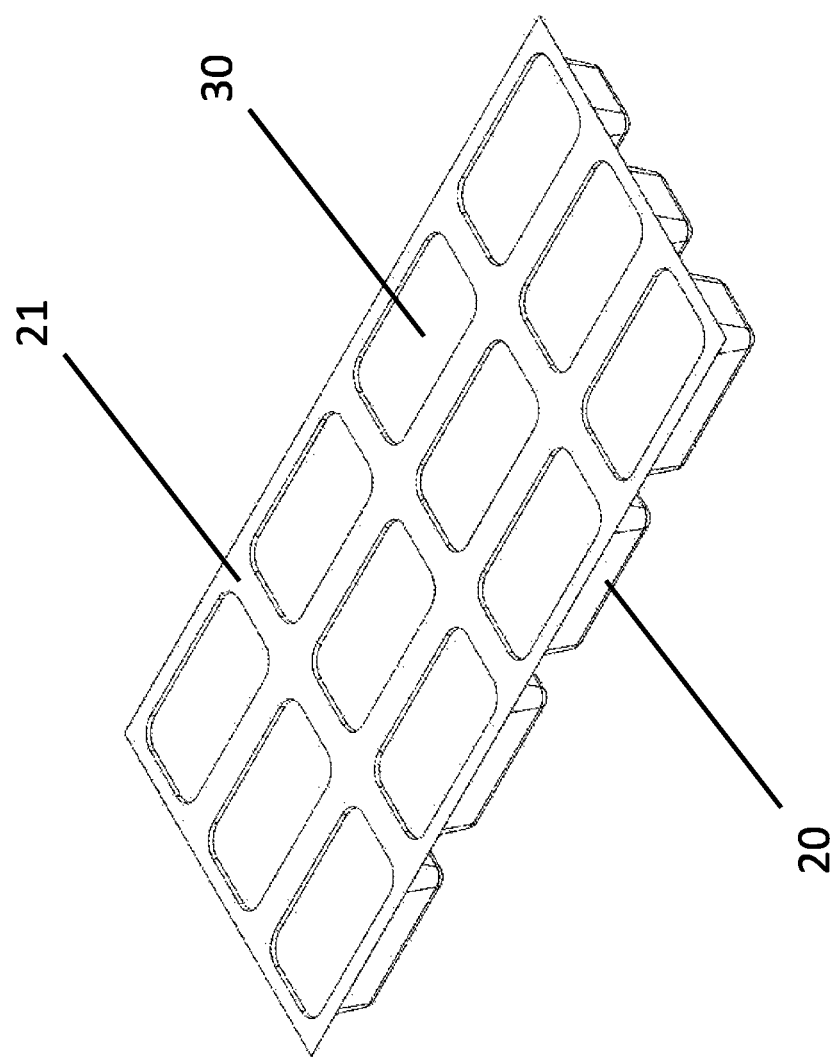
FIG. 2 is an isometric view similar to FIG. 1, but without a foil cover.

FIG. 2 illustrates one embodiment of this invention wherein the sealed cover of FIG. 1 has been removed to display pockets filled with liquid content, e.g., coffee 30.

FIG. 3 and FIG. 4 illustrate one embodiment of this invention wherein the formed pockets 20 can be relatively shallow, have only a small gap between pockets for high packing density, and incorporate minimal headspace 40 since no penetration of needles is envisioned as is typical of single-serve pod products. FIG. 5 is an enlargement of a single pocket, better illustrating the placement of product 30 and the minimal headspace 40. In some embodiments of this invention, the side walls 22 of the pocket are flat, tapered surfaces. In some embodiments of this invention, the corner radii 23 of the pockets are sized to ease manufacturing and reduce tearing of the foil. In some embodiments of this invention, the bottom surface 24 of the pocket is a flat surface. In some embodiments of this invention, side walls 22 and bottom surface 24 are replaced by a complex, generally concave surface that has no distinct corners.

Figure 6:
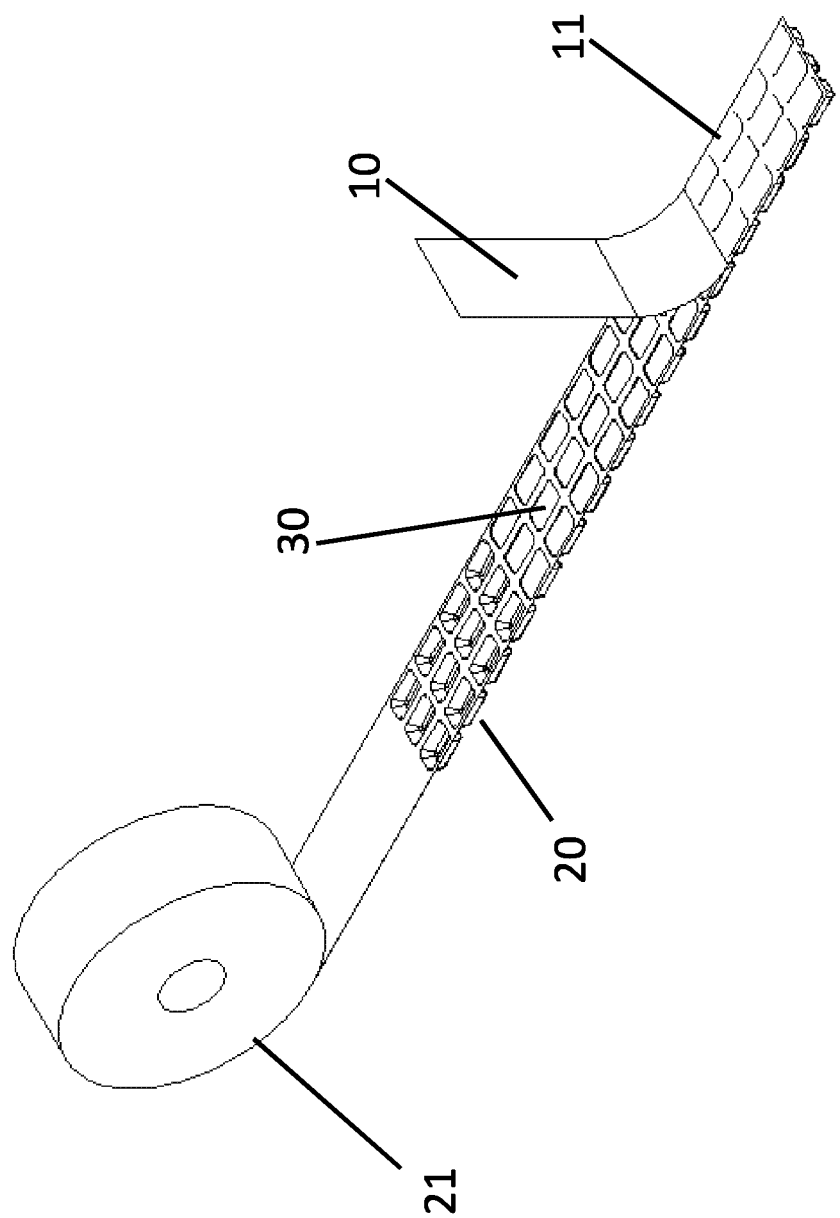
FIG. 6 is an isometric illustration of a packaging line for creating a finished product in accordance with one embodiment.

FIG. 6 illustrates one embodiment of this invention wherein a continuous coil of formable foil 21 can be formed into pockets 20, filled with product 30, a continuous cover material 10 can be added to the line and sealed 11 to create a fully encapsulated product. In some embodiments of this invention, the headspace 40 above the product 30 is filled with an inert gas or a reduced reactivity gas (e.g., nitrogen) prior to sealing. As will be appreciated by one knowledgeable in the art, a wide variety of equipment is available for doing the forming, filling and sealing, so it is not shown. In some embodiments of this invention, the next step in the process, beyond what is shown in FIG. 6, would be a dip through a liquid nitrogen bath or transit through a tunnel freezer to rapidly chill and freeze the pocket contents. Being able to conduct the freezing step in the same line, without breaking the strip until after freezing, imparts significant economic benefit to manufacturing as it eliminates the need for transfer equipment and other sorting and handling associated with manufacturing a single served capsule or pod.

Figure 7:
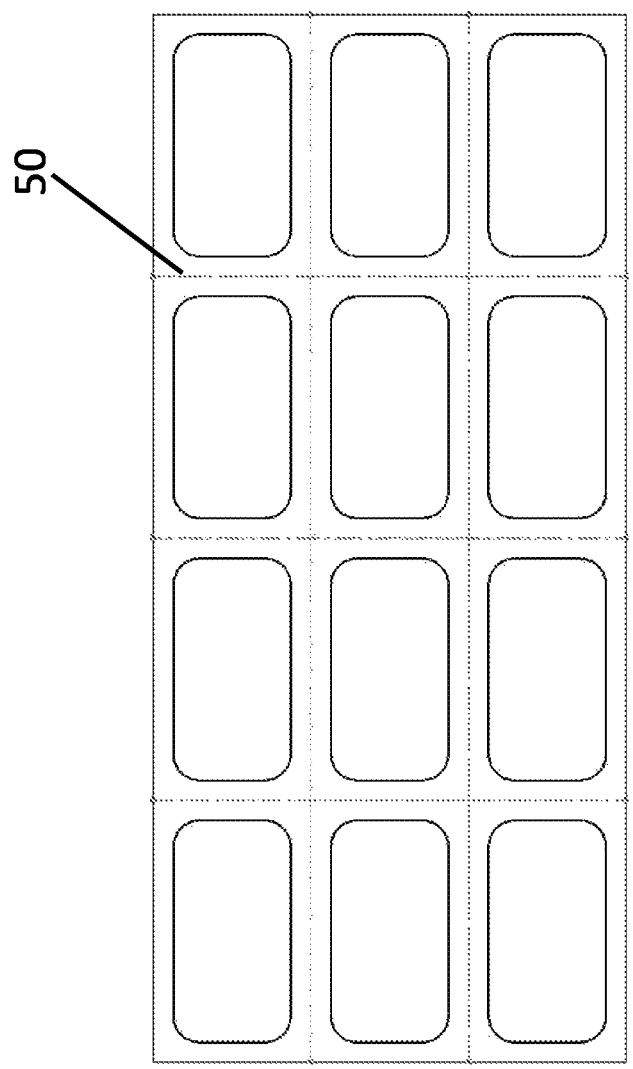
FIG. 7 is a top view of a packaged product without the foil cover in accordance with one embodiment.

FIG. 7 illustrates how the product might be perforated along certain lines 50 to make it easier to tear on packet from a larger sheet.

Figure 8:
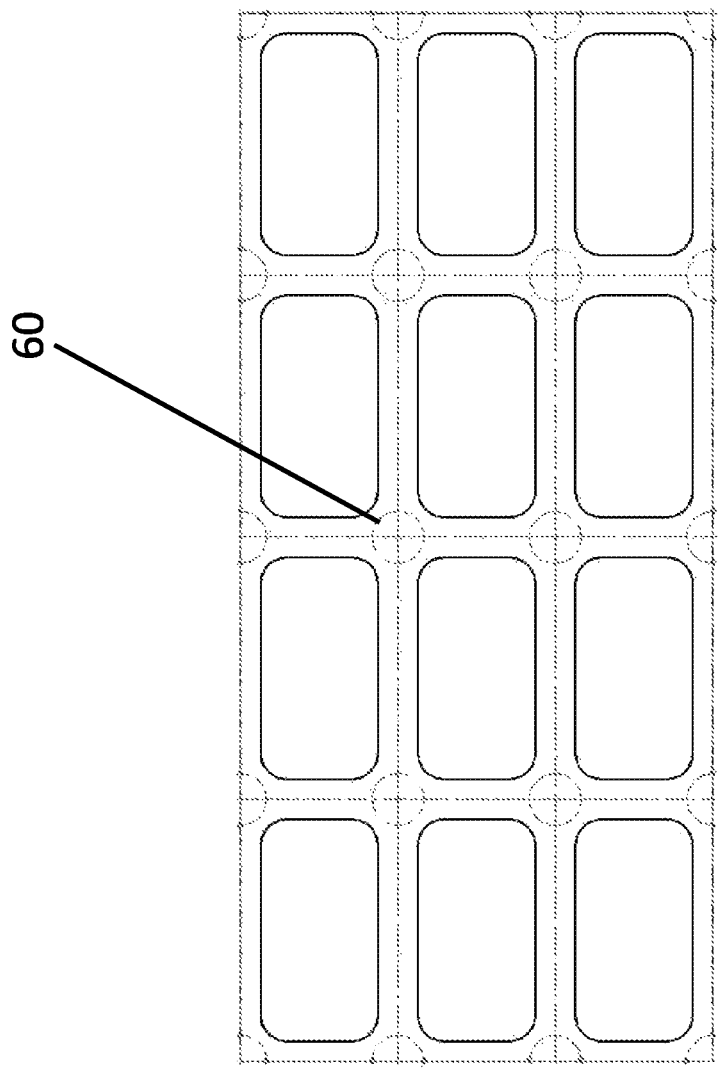
FIG. 8 is similar to FIG. 7.

FIG. 8 illustrates how certain zones 60 might be created wherein the sealing of cover to formed foil base is omitted to allow easier separation of the cover by the user once an individual packet has been separated from a sheet.

In accordance with certain embodiments, a coating may be applied on at least a portion of the pocket to improve performance or provide other benefits. For example, in some cases the coating reduces adhesion of the solid frozen liquid content to the package relative to uncoated surfaces. Examples of such coatings include, but are not limited to, polypropylene, polyethylene, polytetrafluoroethylene As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein.

What is claimed is:

1. A package for delivering frozen liquid content comprising:
   a foil base comprising one or more pockets within a planar surface;
   a solid frozen liquid content disposed in each pocket; and
   a foil cover attached to the planar surface of the foil base, wherein the pockets and the foil cover define one or more sealed cavities for containing the solid frozen liquid content, wherein there is a headspace disposed between the solid frozen content and the foil cover, wherein the headspace comprises at least one of an inert gas and a reduced reactivity gas in place of atmospheric air.

2. The package of claim 1, wherein the package comprises a gas impermeable material configured to preserve freshness and aroma of the solid frozen liquid content.

3. The package of claim 1, wherein the solid frozen liquid content is selected from the group consisting of:
   a frozen coffee extract;
   a frozen tea extract;
   a frozen lemonade concentrate;
   a frozen vegetable concentrate;
   a frozen broth;
   a frozen liquid dairy product;
   a frozen alcohol product;
   a frozen concentrated soup;
   a frozen syrup;
   a frozen fruit concentrate, and any combination thereof.

4. The package of claim 1, wherein the package is filterless.

5. The package of claim 1, wherein the solid frozen liquid content of each pocket is provided in a controlled portion arrangement.

6. The package of claim 5, wherein the controlled portion arrangement comprises a single-serving sized format.

7. The package of claim 1, wherein the package, including the foil base and the foil cover form a gas impermeable package.

8. The package of claim 1, wherein the foil base and the foil cover are joined via heat sealing.

9. The package of claim 1, wherein the foil base and the foil cover are joined via ultrasonic welding.

10. The package of claim 1, wherein the foil base and the foil cover are joined via adhesive.

11. The package of claim 1, further comprising a coating on at least a portion of the pocket, wherein the coating reduces adhesion of the solid frozen liquid content to the package relative to uncoated surfaces.

12. The package of claim 1, wherein the solid frozen liquid content comprises at least one of a frozen liquid extract and a frozen liquid concentrate.

13. The package of claim 1, wherein the pocket further comprises tapered planar sidewalls and a planar bottom.

14. The package of claim 1, wherein the pocket further comprises a generally concave shape.

15. The package of claim 2, wherein the gas impermeable material comprises aluminum.

* * * * *